(12) United States Patent
Uebelacker et al.

(10) Patent No.: US 9,108,555 B2
(45) Date of Patent: *Aug. 18, 2015

(54) BELT FASTENING ON THE REAR MAIN TUBE OF THE BACKREST, IDEALLY ON THE REAR FOOT SITUATED AT THE BOTTOM

(75) Inventors: Roland Uebelacker, Pfreimd (DE); Johann Deml, Thanstein (DE); Sergej Schustjew, Sulzbach-Rosenberg (DE)

(73) Assignee: GRAMMER AG, Amberg (DE)

( * ) Notice: Subject to any disclaimer, the term of this patent is extended or adjusted under 35 U.S.C. 154(b) by 352 days.

This patent is subject to a terminal disclaimer.

(21) Appl. No.: 13/426,081

(22) Filed: Mar. 21, 2012

(65) Prior Publication Data

US 2012/0261976 A1    Oct. 18, 2012

(30) Foreign Application Priority Data

Mar. 28, 2011    (DE) .................. 10 2011 015 347

(51) Int. Cl.
*B60R 22/26* (2006.01)
*B60N 2/68* (2006.01)

(52) U.S. Cl.
CPC ....... *B60N 2/688* (2013.01); *B60N 2/68* (2013.01); *B60R 22/26* (2013.01)

(58) Field of Classification Search
CPC ....... B60N 2/688; B60N 2/4221; B60R 22/26
USPC ............... 297/452.18, 452.19, 446.1, 446.2, 297/447.2, 447.4, 449.1
See application file for complete search history.

(56) References Cited

U.S. PATENT DOCUMENTS

| 1,885,630 | A | * | 11/1932 | Ronan | .................. 297/446.1 |
| 3,131,971 | A | * | 5/1964 | Gunn | .................. 297/446.2 |
| 3,697,128 | A | | 10/1972 | Strien et al. | |

(Continued)

FOREIGN PATENT DOCUMENTS

| DE | 1812785 | 6/1970 |
| DE | 2113579 | 10/1972 |

(Continued)

OTHER PUBLICATIONS

Search Report corresponding to European Patent Application No. 12160366.6, Dated Jul. 4, 2012.

(Continued)

*Primary Examiner* — David R Dunn
*Assistant Examiner* — Tania Abraham
(74) *Attorney, Agent, or Firm* — Lathrop & Gage LLP

(57) ABSTRACT

Disclosed is a vehicle seat with seat part, backrest, belt restraining system and support structure supporting the seat part and backrest. Belt restraining system comprises belt reversal means and belt lock. Belt reversal means is positioned in an upper corner region of the backrest and belt lock positioned in seat area of seat part. Support structure has asymmetrical framework with main force braces extending substantially vertically. Main force braces converge in junction region and underside of support structure a first, second and third one of main force braces is arranged on the side towards the junction region as a thrust brace guided forwards as far as a front foot; on the side towards the junction region as a tension brace at the rear guided as far as a first rear foot; tension/thrust brace at the rear guided as far as a further rear foot.

9 Claims, 2 Drawing Sheets

(56) References Cited

U.S. PATENT DOCUMENTS

Figure 1:
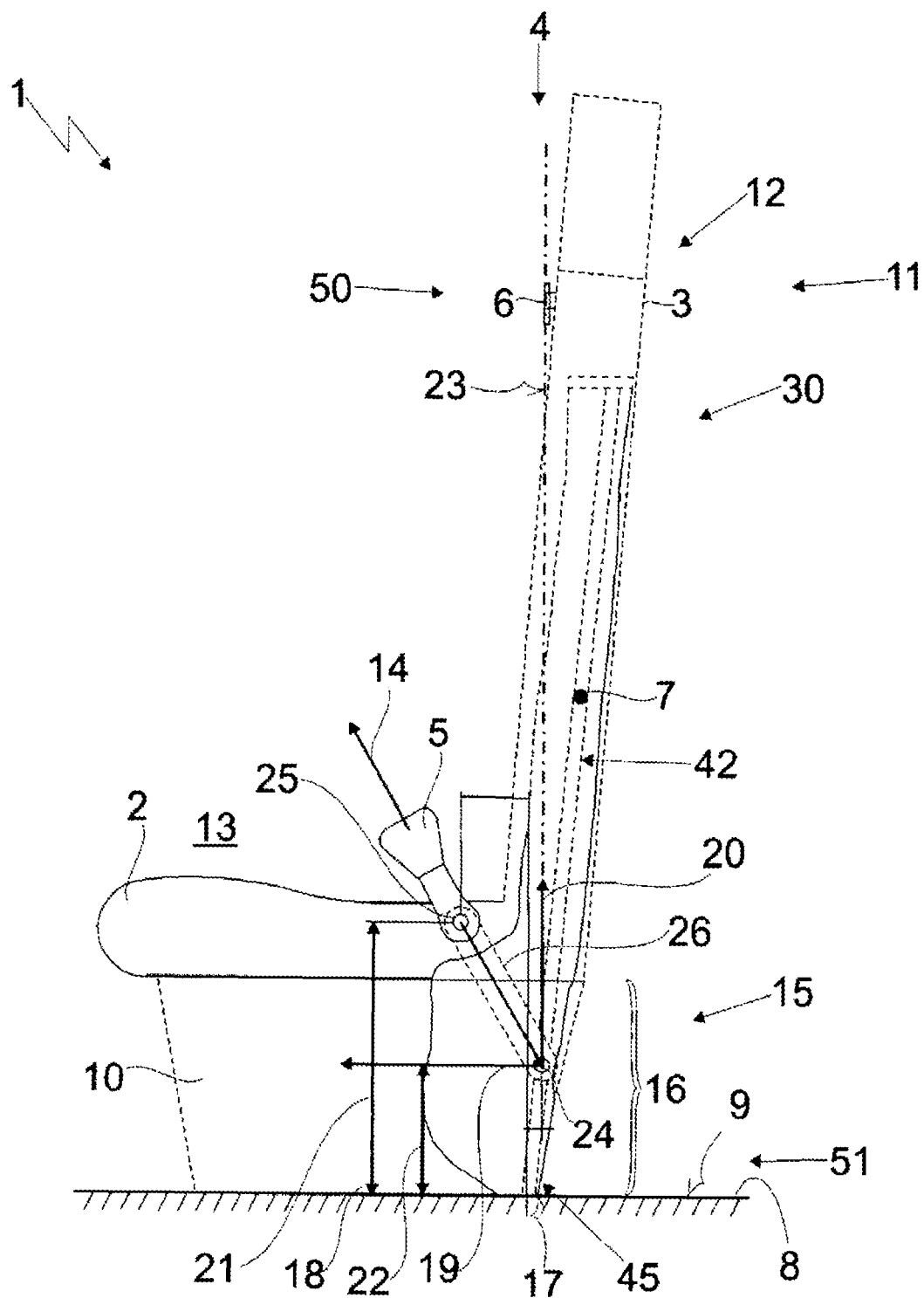

| | | | |
|---|---|---|---|
| 3,711,153 A | 1/1973 | Cunningham | |
| 4,192,545 A | 3/1980 | Higuchi et al. | |
| 4,585,273 A | 4/1986 | Higgs et al. | |
| 4,993,778 A | 2/1991 | Colin et al. | |
| 5,310,247 A | 5/1994 | Fujimori et al. | |
| 5,318,341 A * | 6/1994 | Griswold et al. | 297/362.11 |
| 5,362,132 A * | 11/1994 | Griswold et al. | 297/483 |
| 5,447,360 A * | 9/1995 | Hewko et al. | 297/452.18 |
| 5,452,941 A * | 9/1995 | Halse et al. | 297/480 |
| 5,658,048 A * | 8/1997 | Nemoto | 297/410 |
| 6,045,186 A * | 4/2000 | Butt et al. | 297/296 |
| 6,082,823 A * | 7/2000 | Aumont et al. | 297/452.2 |
| 6,231,119 B1 | 5/2001 | Zheng | |
| 6,666,520 B2 | 12/2003 | Murphy et al. | |
| 7,246,854 B2 | 7/2007 | Dingman et al. | |
| 8,820,842 B2 | 9/2014 | Uebelacker et al. | |
| 2002/0079734 A1 | 6/2002 | Murphy et al. | |

FOREIGN PATENT DOCUMENTS

| | | | |
|---|---|---|---|
| DE | 3136651 | 3/1983 | |
| DE | 4208150 A1 * | 9/1993 | B60N 2/44 |
| DE | 68906113 | 2/1994 | |
| DE | 69202905 | 12/1995 | |
| DE | 19741602 | 3/1999 | |
| EP | 0646493 | 4/1995 | |
| FR | 1269908 | 8/1961 | |
| GB | 1383922 | 2/1974 | |
| GB | 2303297 | 2/1997 | |
| WO | WO 90/14245 | 11/1990 | |
| WO | WO 95/29609 | 11/1995 | |

OTHER PUBLICATIONS

Examination Report corresponding to German Patent Application No. 10 2011 015 347.0, Dated Jul. 9, 2014—see, e.g., p. 2, lines 4-5.

Office Action corresponding to U.S. Appl. No. 13/427,649 (now U.S. Pat. No. 8,820,842) dated Dec. 24, 2013.

Response to Office Action corresponding to U.S. Appl. No. 13/427,649 (now U.S. Pat. No. 8,820,842) dated Apr. 24, 2014.

Notice of Allowance corresponding to U.S. Appl. No. 13/427,649 (now U.S. Pat. No. 8,820,842) dated May 15, 2014.

* cited by examiner

BELT FASTENING ON THE REAR MAIN TUBE OF THE BACKREST, IDEALLY ON THE REAR FOOT SITUATED AT THE BOTTOM

CROSS-REFERENCE TO RELATED APPLICATIONS

This application claims the benefit of priority of German Patent Application No. DE 10 2011 015 347.0, filed Mar. 28, 2011, which is hereby incorporated by reference in its entirety.

DESCRIPTION

The invention relates on the one hand to a vehicle seat with a seat part, with a backrest, with a belt restraining system and with a support structure for supporting the seat part as well as the backrest, in which the belt restraining system comprises a belt reversal means and a belt lock and in which the belt reversal means is positioned in an upper corner region of the backrest and the belt lock is positioned in a seat area of the seat part.

The invention relates on the other hand to a vehicle seat with a seat part, with a backrest and with a belt restraining system, in which the belt restraining system comprises a belt reversal means and a belt lock and in which the belt reversal means is positioned in an upper corner region of the backrest and the belt lock is positioned in a seat area of the seat part.

Vehicle seats of the generic type are adequately known from the prior art. In particular, in motor vehicles or utility motor vehicles, such as tractors or the like, vehicle seats are made more robust in order to be able to meet tougher conditions of use of these vehicles. In general, however, a reduction in weight as a whole is desired even in vehicles of this type.

In this respect the object of the present invention is to be able to design vehicle seats of the generic type with a reduction in weight, without aspects relating to comfort and/or relating to safety having to be ignored in this case.

In accordance with a first aspect of the invention the present object is attained by a vehicle seat with a seat part, with a backrest, with a belt restraining system and with a support structure for supporting the seat part as well as the backrest, in which the belt restraining system comprises a belt reversal means and a belt lock and in which the belt reversal means is positioned in an upper corner region of the backrest and the belt lock is positioned in a seat area of the seat part, the vehicle seat being characterized in that the support structure has an asymmetrical framework with main force braces extending substantially vertically, in which on the top side of the support structure the main force braces converge in the junction region and on the underside of the support structure a first one of the main force braces is arranged on the side towards the junction region as a thrust brace guided forwards as far as a front foot of the support structure, a second one of the main force braces is arranged on the side towards the junction region as a tension brace at the rear guided as far as a first rear foot of the support structure and a third one of the main force braces is arranged as a tension/thrust brace at the rear guided as far as a further rear foot of the support structure, a fastening means of the belt lock being arranged in the lower third or in the lower quarter of the third main force brace.

Just as a result of this guidance—according to the invention—of the three main force braces, the support structure of the vehicle seat can have an unusually light design in terms of weight, since essentially only the front one of the main force braces has to be made particularly stable in order to be able to cope with the forces which act upon the vehicle seat in particular in the event of a crash.

In an advantageous manner, in particular the rear main force brace on the side towards the junction region can be made less stable on account of the framework designed according to the invention, so that a satisfactory reduction in weight can be achieved on the vehicle seat by this alone.

In addition, the third main force brace can also be designed to be reduced in weight with respect to the first main force brace, since like the second main force brace it too is less heavily stressed in particular in the event of a crash than the main force brace guided forwards here.

If, in addition, the fastening of the belt lock is arranged in the lower third or in the lower quarter of the third main force brace, in particular as close as possible to the underside of the support framework, the moments acting upon the support structure in the event of a crash are advantageously reduced since, as a result of this, a lever path is sharply reduced between the belt lock fastening and the bodywork component on which the support structure is arranged. The moments resulting from this can also be reduced in a corresponding manner, as a result of which the vehicle seat can once again be made lighter.

If the restraining force of the belt of a person belted up in the vehicle seat is specifically considered, in an advantageous manner this restraining force acts upon the vehicle seat only very far below and/or far to the rear, since the fastening position of the belt lock and thus the transmission of force from the fastening device to the support structure takes place correspondingly far below or far to the rear on the support structure.

In this respect the belt restraining force is also divided into its force components further below and/or further to the rear in the vehicle seat, so that moments resulting from this and acting upon the support structure can be reduced, as a result of which a further reduction in weight on the vehicle seat is capable of being achieved.

Ideally the fastening of the belt lock is accordingly at the lower end of the support structure, but this does not generally work successfully, since this lower end in the fitted state of the vehicle seat is generally built around and is therefore frequently not freely accessible for a suitable fastening device.

It is to be understood that the support structure can comprise further structural braces which all need to be made less solid or of less high quality, however, than the main force braces described here.

The term "support structure" in this case describes a framework which, in particular, carries the seat part and the backrest and which in the sense of the invention is capable of being fastened to a bodywork component of a vehicle, so that forces acting upon the vehicle seat by means of the support structure are capable of being introduced into the bodywork component.

The terms "on the top side" and "on the underside" in the sense of the invention describe regions of the vehicle seat and the support structure in question respectively.

It is to be understood that the fastening of the belt lock can be carried out by means of different fastening devices.

If the fastening device of the belt lock has at least in part the support structure of the vehicle seat, forces acting upon the belt lock can be introduced into the bodywork component directly by way of the actual support structure of the vehicle seat. In this respect other components or groups of components of the vehicle seat are no longer loaded or are not loaded by these belt lock restraining forces, as a result of which they can be designed in a manner optimized with respect to weight.

In accordance with a further aspect of the invention the object is also attained by a vehicle seat with a seat part, with a backrest and with a belt restraining system, in which the belt restraining system comprises a belt reversal means and a belt lock and in which the belt reversal means is positioned in an upper corner region of the backrest and the belt lock is positioned in a seat area of the seat part, the vehicle seat being characterized in that the belt reversal means and the belt lock are both fastened to a common support structure of the vehicle seat.

On account of the fact that both the belt reversal means and the belt lock are both fastened to the common support structure, the weight of the vehicle seat can be reduced in an advantageous manner, since other vehicle components or respectively respective groups of components, on which the belt reversal means and the belt lock are fastened separately from each other in a conventional manner, need to be designed in a less solid manner. Ideally, it is possible to dispense with individual components or groups of components of this type entirely.

In this respect, forces acting upon the belt reversal means and forces acting upon the belt lock can be introduced into the bodywork component directly by way of the common support structure of the vehicle seat.

As a result of moving the fastening position of the belt reversal means and of moving the fastening position of the belt lock to the common support structure, torques caused in particular by the forces of the belt reversal means and the forces of the belt lock and acting upon the vehicle seat can be reduced, so that in the present case it is possible to dispense, in particular, with a reinforcement of material or the previously usual provision of additional bracing elements, such as for example junction plates. This necessarily leads to a further reduction in weight.

An extremely advantageous variant of embodiment provides that the belt reversal means is arranged on a first end region of the third main force brace and the fastening of the belt lock is arranged on a further end region of the third main force brace opposite the first end region, as a result of which in an advantageous manner the entire third main force brace can be available in the function of a tension rod as an abutment for absorbing the belt restraining forces. In this respect the third main force brace can be designed in a less solid manner and can nevertheless withstand the high specific loads.

If, in addition, the fastening of the belt lock or the fastening device of the belt lock is arranged below the seat part and/or behind the backrest, the fastening position of the fastening device can on the one hand be relatively far below and can on the other hand be relatively far towards the rear on the vehicle seat. As a result, forces occurring on the belt restraining system can be introduced in an advantageous manner from the fastening device directly into the support structure designed in particular for the absorption of forces, although a greater distance between the belt lock and a structural brace of the support structure, preferably the third main force brace, has to be bridged for this.

If the fastening of the belt lock to a structural brace or respectively to the third main force brace is made in a range of less than 30 cm, preferably of less than 20 cm, measured from the lower end of the support structure, in particular the moments described above can be reduced in a particularly advantageous manner.

The advantages described above can be further reinforced if the fastening device is arranged in a foot region or on a foot part of the support structure.

With respect to a further preferred embodiment of the invention, it is advantageous for the first main force brace to be arranged, in particular above the seat part, extending to a point in front of the backrest and to be arranged laterally on or adjacent to the seat part.

As a result of this, it is possible for regions of the support structure which in particular absorb main forces and which are therefore particularly important to extend very far into the front region of the vehicle seat, as a result of which a support of the vehicle seat optimized in terms of forces can be achieved with respect to the chassis component.

Cumulatively it is advantageous for the support structure to have main force braces, in which at least one of the main force braces is arranged laterally on or adjacent to the seat part.

Both of the last-named combinations of features are advantageous in particular on the side of a belt mounting, since on this side of the belt mounting restraining forces are introduced into the support structure of the present vehicle seat very far towards the top.

In order to be particularly well protected from an uncontrolled buckling of the main force braces even in the event of very high loading, it is extremely advantageous for the first main force brace in particular to be curved and to be made bulbous in the sitting direction.

A defined pre-determined bending point can be produced in an advantageous manner with a curved main force brace.

In particular, the risk of uncontrolled buckling in the transverse direction, i.e. transversely to the sitting direction of a person, can be reduced by a purposeful anchoring in accordance with the arch principle.

In addition, it is consequently also advantageous for the second main force brace to be made bulbous in the sitting direction.

In an advantageous manner the second main force brace is arranged behind the seat part, as a result of which it can satisfactorily absorb forces specifically acting vertically upon the vehicle seat.

The support structure can be supported over a wide area in the present case on a base if the third main force brace is arranged transversely behind the seat part as viewed in the sitting direction, as a result of which it can satisfactorily absorb not only forces acting vertically upon the vehicle seat but also in particular, in a structurally simple manner, the belt restraining forces.

In addition, the present vehicle seat can be advantageously supported laterally by the framework according to the invention. In this way, an advantageous three-leg framework can be formed on a vehicle seat by means of the present asymmetrical framework, so that it is possible to dispense with a further main force brace guided forwards.

By way of example this further main force brace guided forwards could not be implemented starting from the junction region at the top, since the seat part with the seat region is situated between the junction region and an opposed further front support structure foot of the vehicle seat.

A preferred embodiment variant further provides that the third main force brace is arranged supported on the side towards the foot region on a triangle arrangement comprising further support structure braces. By means of this triangle arrangement a first important further distribution of the support structure braces on the asymmetrical framework can be achieved.

The support structure can be made even more compact if a rear vertical brace of the triangle arrangement extends from the further rear foot of the support structure to the junction region and, in particular, merges into the second main force brace there.

In addition, in order to be able to design the support structure with a further reduction in weight, it is also advantageous for a front vertical brace of the triangle arrangement to be arranged orientated vertically towards the front from the further rear foot of the support structure and in particular to support a horizontal brace of the triangle arrangement.

Cumulatively it is advantageous for a horizontal brace of the triangle arrangement to extend from a rear vertical brace of the triangle arrangement as far as a further front foot of the support structure, as a result of which a stabilization of the support structure can be improved.

In particular, beside a support on the first main force brace a front support device of the seat part can be additionally supported on this horizontal brace.

Figure 2:
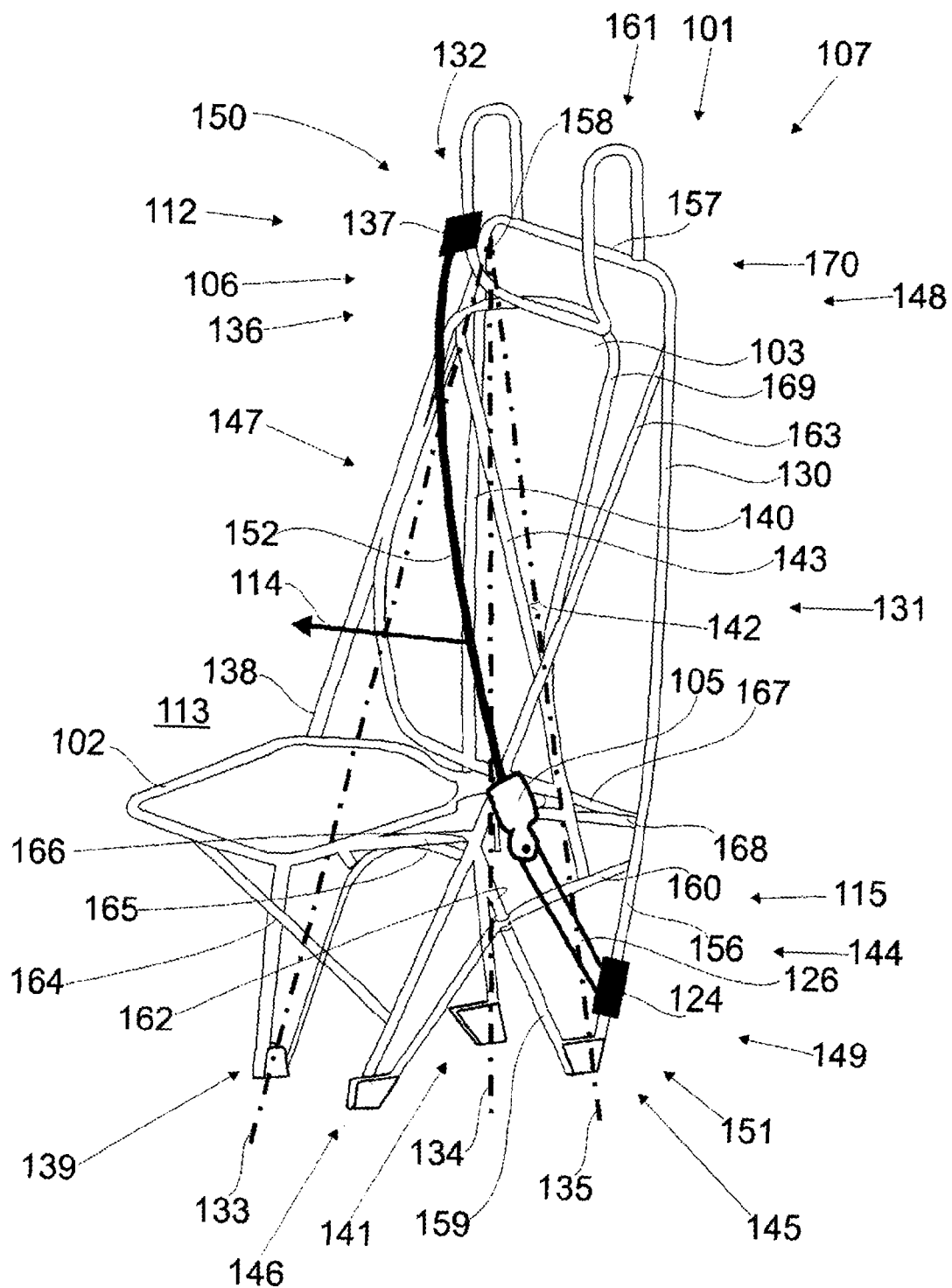

Further advantageous brace patterns of the support structure are described in particular with reference to the embodiment shown in FIG. 2.

An advantageous guiding device of the main forces can be incorporated into the support structure just by means of the three main force braces explained here. In this respect, a preferred variant of embodiment also provides that both the belt reversal means and the belt lock are fastened to a guiding device of the main forces of the support structure.

The term "guiding device of the main forces" covers any device by means of which forces acting upon the vehicle seat can be introduced into the bodywork component of a vehicle.

It is to be understood that the guiding device of the main forces can be constructed both by means of structural braces extending horizontally or vertically and by means of structural braces orientated between them, provided that the structural braces provided make it possible for lines of action of the main forces extending substantially vertically to be achieved with respect to the support structure.

In addition, a support structure designed in this way makes it possible for the seat part provided and the backrest provided to need to satisfy essentially only the force requirements of a person sitting in the present vehicle seat, as a result of which the vehicle seat can be produced with a further reduction in weight in an advantageous manner.

In an advantageous manner forces acting upon the belt reversal means and forces acting upon the belt lock can be introduced into the bodywork component directly by way of the guiding device of the main forces, so that the forces can be advantageously absorbed by the vehicle seat.

In this way, a guiding device of the main forces with main force braces, to which both the belt reversal means and the belt lock are fastened, is also advantageous.

In particular, the main force braces are particularly suitable for absorbing the forces of the belt reversal means and the forces of the belt lock. In this respect it is advantageous for the belt reversal means and the belt lock to be fastened there.

The term "main force braces" describes those structural braces of the support structure which form the lines of action of the main forces extending substantially vertically.

In addition, a guiding device of the main forces is advantageous which has main force braces which on the top side of the support structure are arranged converging in a junction region of the guiding device of the main forces and on the underside of the support structure are arranged at a further distance from one another than in the junction region.

As a result, the introduction of forces into the bodywork component can be designed to be less stressing, in particular for the bodywork component, if the main force braces are arranged at a greater distance from one another on the side of the vehicle seat facing the bodywork component than in the junction region on the top side.

It is also advantageous for the junction region to be arranged in the upper third of the support structure or the vehicle seat respectively, in particular for the junction region to embrace a corner region of the support structure or of the vehicle seat respectively. As a result, the support structure can be made as slim as possible there, as a result of which a further reduction in weight can be achieved.

In an advantageous manner the junction region comprises a holding device for a belt mounting.

On account of the fact that the junction region is arranged at the tip of the guiding device of the main forces in which at least two, and preferably three, main force braces converge, the support structure is made extremely stable in the junction region, so that, in particular, belt restraining forces can be withstood unusually well by the support structure in the junction region.

Cumulatively it is advantageous for the support structure to comprise a guiding device of the main forces with an asymmetrical framework in which lines of action of the main forces extending substantially vertically are arranged converging more closely on the top side of the support structure than on the underside of the support structure.

On account of a framework made asymmetrical in this way, the guiding device of the main forces can also be designed to meet requirements with respect to the acting forces particularly well.

It is to be understood that the asymmetrical framework or the guiding device of the main forces respectively can be implemented physically in various designs. The asymmetrical framework or the guiding device of the main forces respectively can be implemented extremely simply in structural terms with a three-leg framework.

It is preferable for structural braces—defined by the three-leg framework—of the asymmetrical framework or the guiding device of the main forces respectively to converge in the junction region of the support structure.

In this respect it is readily evident that the lines of action of the main forces extending substantially vertically can be orientated so as to converge on the top side of the support structure and to diverge on the underside of the support structure by means of the three-leg framework in a structurally simple manner.

In addition, it is advantageous, in particular, for the guiding device of the main forces to have a framework with main force braces in which at least one of the main force braces is arranged so as to extend, in particular above the seat part, to a point in front of the backrest.

As a result it is possible for regions of the support structure or the guiding device of the main forces respectively which, in particular, absorb main forces and which are thus particularly important to be positioned very far into the front region of the vehicle seat, as a result of which a support of the vehicle seat—optimized with respect to the forces—can be achieved with respect to the bodywork component.

Cumulatively it is advantageous for the guiding device of the main forces to have a framework with main force braces in which at least one of the main force braces is arranged laterally on or adjacent to the seat part.

Both of the last-named combinations of features are advantageous in particular on the side of the belt mounting, since on this side of the belt mounting even restraining forces of the belt are introduced into the support structure or into the guiding device of the main forces of the present vehicle seat very far towards the top.

At this point it should be mentioned for the sake of completeness that the invention is also achieved by a vehicle, by a motor vehicle or by a utility motor vehicle which is characterized by a vehicle seat according to any one of the features described here.

The vehicle seat according to the invention can, in particular, be implemented in the form of a front passenger seat of a vehicle of this type, front passenger seats of utility motor vehicles in particular generally not being sprung. In particular, therefore, the front passenger seat can advantageously be provided with the present rigid support structure on which the fastening of the belt lock engages as low as possible.

Further advantages, aims and properties of the present invention are explained with reference to the accompanying drawing and the following description, in which vehicle seats having a support structure and belt locks which are fastened by means of a fastening device to the support structure in each case are illustrated and described by way of example. For the sake of easy visualization, it is also possible for essential features of the invention to be shown and described only with reference to one of the embodiments in each case, although they apply to the two embodiments. In the drawing:

FIG. 1 is a diagrammatic side view of a first vehicle seat with a fastening device of a belt lock, in which the fastening device is flange-mounted in the foot region of a framework of a support structure of the vehicle seat, and FIG. 2 is a diagrammatic perspective view of a front passenger seat with a fastening device of a belt lock, in which the fastening device is likewise flange-mounted in the foot region of a framework of a support structure of the vehicle seat.

The vehicle seat 1 shown in FIG. 1 comprises a seat part 2, a backrest 3 and an integrated belt restraining system 4—illustrated in this case by a belt lock 5 and a belt reversal device 6—for restraining a person (not shown here) sitting on the vehicle seat 1.

The vehicle seat 1 is, in addition, characterized by a support structure 7 which on one side carries the seat part 2 and the backrest 3.

On the other side the entire vehicle seat 1 can be fastened by means of the support structure 7 to a bodywork component 8 of a utility motor vehicle (not shown in detail in this case), the bodywork component 8 being the floor of a driver's cab 9. Below the seat part 2 the vehicle seat 1 is covered further with a sheet metal cladding 10.

Whereas the belt reversal means 6 is positioned in an upper third 11 of the vehicle seat 1 in the right-hand corner region 12 of the backrest 3, the belt lock 5 is situated in a seat area 13 of the seat part 2.

According to the invention the belt lock 5 is nevertheless fastened to the support structure 7 of the vehicle seat 1, so that belt restraining forces 14 possibly acting upon the belt lock 5 can be introduced directly into the support structure 7.

As a result, in an advantageous manner other components of the vehicle can have a less solid and thus lighter design than customary hitherto when the belt lock 5 is attached for example to the seat part 2.

The fastening 15 of the belt lock 5 is advantageously implemented in a fastening region 16 which has a height of less than 30 cm, preferably less than 20 cm, from a lower end 17 of the support structure 7.

In this respect the fastening 15 of the belt lock 5 is situated in an advantageous manner in a foot region 18 of the support structure 7 and thus closer to an attachment to the bodywork component 8.

In this case, in an advantageous manner a division, in particular, of the belt restraining forces 14 into horizontal forces 19 and vertical forces 20 is made not at a conventional height 21 of the seat part 2 but just above the lower end 17 of the support structure 7 at a new advantageous height 22.

In this respect the fastening 15 of the belt lock 5 is implemented below the seat part 2 and the rear backrest 3.

On account of a shorter lever path which results from this and which essentially corresponds to the new height 22, between the lower end 17 of the support structure 7 and the fastening 15, the moments exerted upon the support structure 7 are reduced accordingly.

In addition, the forces 20 acting vertically can be shifted into a vertical plane 23 which is situated closer to the belt reversal means 6 than has been possible until now.

In order to be able to hold the belt lock 5 in its position in the seat area 13 capable of being achieved in a satisfactory manner on the one hand and to be able to effect a fastening 15 optimized in terms of the forces far below on the support structure 7 on the other hand, a fastening device 24 is arranged between the belt lock 5 and the support structure 7.

As a result, an otherwise customary fastening point 25, which is no longer present in this case according to the invention, can be shifted into the more expediently positioned fastening device 24 on the support structure 7.

In this embodiment the fastening device 24 is part of the support structure 7, so that it embraces or forms at least in part the support structure 7 of the vehicle seat 1.

In addition, the fastening device 24 comprises a fastening plate 26, by means of which the belt lock 5 is articulated to the support structure 7.

The fastening device 24 can thus be designed for example in the form of a structural brace or in the form of a main force brace of the support structure 7.

Ideally the fastening 15 is implemented, not on any one of the structural braces 30, but precisely on one of altogether three main force braces (see FIG. 2 for this) of the support structure 7, of which only the third main force brace 42 has been shown in part for the sake of easy visualization.

In an advantageous manner the belt reversal means 6 is arranged on a first end region 50 of the third main force brace 42 and the fastening 15 of the belt lock is arranged on a further end region 51 of the third main force brace 42 opposite the first end region 50, as a result of which the third main force brace 42 is available as a whole for absorbing belt restraining forces 14.

The first end region 50 is situated substantially at the height of the belt reversal means 6 and the further end region 51 at the height of a foot 45 of the support structure.

The further support structure 107—shown in considerably greater detail in FIG. 2—of a front passenger seat 101 of a vehicle comprises a plurality of structural braces 130 of this type which essentially support a seat part 102 and a backrest (not indicated in this case).

A structural brace region 131 of the support structure 107 is designed in this case in the form of a fastening device 124 (shown darker in this case) for a belt lock 105 of a belt restraining system (not additionally numbered in this case) of the front passenger seat 101 of the vehicle.

A fastening plate 126 is attached between the belt lock 105 and the fastening device 124 in order to bridge the distance between a preferred position of the belt lock in the seat area 113 and a structural brace region.

In this further embodiment the individual structural braces 130 are welded together for the greater part to form an asymmetrical framework 131 of the support structure 107 and consist of a high-grade steel material.

By means of the plurality of structural braces 130 a guiding device 132 of the main forces with essentially three lines of action 133, 134 and 135 of the main forces is also formed on the support structure 107, the three lines of action 133, 134 and 135 of the main forces converging in a junction region 136 of the support structure 107 or the guiding device 132 of the main forces respectively.

The junction region 136 is situated in an upper corner region 112 of the support structure 107. A belt mounting 137, to which a belt reversal device 106 of the belt restraining system is capable of being fastened, is provided in the junction region 136.

In this embodiment the first line of action 133 of the main forces is essentially formed by a first main force brace 138, which stretches in a curve from the junction region 136 to a front support structure foot 139.

The first main force brace 138 is designed substantially in the form of a thrust brace which in addition is made curved.

In this respect the first line of action 133 of the main forces extends outside the first main force brace 138 at least in part.

In this case the first main force brace 138 projects, in particular above the seat part 102, into the seat area 113 of the front passenger seat 101 of the vehicle in front of the backrest in a bulging manner.

In an advantageous manner the first main force brace 138 is embedded—as the forward one of the main force braces 138, 140 and 142—in a lateral guidance device (not shown in this case) of the front passenger seat 101 of the vehicle.

A second curved main force brace 140 forms the second line of action 134 of the main forces, the second main force brace 140 extending in a curved manner from the junction region 136 in the sitting direction as far as a first rear foot 141 of the support structure.

The third line of action 135 of the main forces is defined by a combined third main force brace 142 which comprises a curved upper part 143 and a triangular lower part 144.

Whilst the curved upper part 143 extends into the junction region 116, the triangular lower part 144 extends into a further rear foot 145 of the support structure.

A rear vertical brace 156 of the triangular lower part 144 extends vertically, curved in a bulbous manner in a direction opposed to the sitting direction, as far as the top side 148 of the support structure 107. There it passes into a horizontally extending structural brace 157 which is arranged transversely to the sitting direction. On the side towards the junction region the horizontally extending structural brace 157 curves into a structural brace 158 which is directed downwards and which passes into the second main force brace 140 at the junction region 116. As a result, an extremely good support of the vehicle seat 101 is provided on the rear side of the support structure 107.

In addition, for the purposes of further stabilization, the triangular lower part 144 has a front vertical brace 159 which is arranged orientated vertically forwards from the further rear foot 145 of the support structure and, in particular, supports a curved horizontal brace 160 of the triangular arrangement 144.

Since the horizontal brace 160 is also supported by the rear vertical brace 156, a belt lock side 161 of the vehicle seat 101 also has a highly stable and nevertheless light design.

The curved upper part 143 of the third main force brace 142 is thus advantageously supported on the horizontal brace 160 of the triangular lower part 144, which in turn is supported both by the rear vertical brace 156 and by the front vertical brace 159.

In addition, the horizontal brace 160 extends in an advantageous manner starting from the rear vertical brace 156 as far as a further front foot 146 of the support structure and in this case supports at the same time a vertical support brace 162 of a seat part mounting brace 163 of the support structure 107 which is fastened at the top side 148 to the rear vertical brace 156 and likewise terminates in the further front foot 146 of the support structure.

A cross brace 164 also extends vertically from the seat part mounting brace 163 for the further support of a seat part frame 165 which in a junction point 166 meets with the front vertical brace 159 at the seat part mounting brace 163.

The cross brace 164 is supported on the first main force brace 138 on the side towards the junction region.

Further to the rear the second main force brace 140 and the rear vertical brace 156 are connected further to each other in a stabilizing manner by a lower transverse connecting brace 167.

Starting from this transverse connecting brace 167 at the end, horizontal connecting braces 168 which are preferably designed in the form of a further cross brace extend at one end starting (covered in this case by the seat part 102) from the second main force brace 140 to the seat part frame 165 and at the other end starting from the rear vertical brace 156 to the seat part frame 165.

The backrest (not shown in this case) is held by means of an oval brace 169 and a head support (likewise not shown in this case) is held by means of a U-shaped brace arrangement 170 on the support structure 107.

It is to be understood that the support structure 107 described here can be supplemented if necessary by further structural braces 130.

The further front foot 146 of the support structure is not situated on one of the lines of action 133, 134 and 135 respectively of the main forces. In this respect this plays only a subordinate role in the overall support of the vehicle seat 101 with respect to a bodywork component (not shown in this case).

In fact, the guiding device 132 of the main forces is formed essentially by a three-leg framework 147 which is supplemented by further structural braces 130 of the support structure 107.

On account of the fact that the guiding device 132 of the main forces is designed in such a way that the three lines of action 133, 134 and 135 of the main forces converge on the top side 148 of the support structure 107 in the common junction region 136, the support structure 107 and, in particular, the guiding device 132 of the main forces thereof can be designed in a very compact manner.

In contrast, the three lines of action 133, 134 and 135 of the main forces are arranged at a greater distance from one another on the underside 149 of the support structure 107 than in the junction region 136, so that the main forces occurring on the vehicle seat 101 can be introduced into the bodywork component over a large area in an advantageous manner.

The guiding device 132 of the main forces can be implemented with a reduced weight essentially merely by the first main force brace 138, the second main force brace 140 and the third main force brace 142, so that the guiding device 132 of the main forces can be produced in this embodiment essentially by the three-leg framework 147 which is designed in a simple manner and which despite the simple and light design in terms of weight guarantees a very stable support structure 107.

At this point it should be mentioned for the sake of completeness that in an advantageous manner the belt mounting 137 is arranged on a first end region 150 of the third main force brace 142 and the belt lock fastening 115 is arranged on a further end region 151 of the third main force brace 142 opposite the first end region 150.

The first end region 150 is situated substantially at the height of the belt mounting 137 and the further end region 151 at the height of the further rear foot 145 of the support structure.

As a result, belt restraining forces 114 can also engage in particular at corner regions 150 and 151 of the support structure 107 or the guiding device 132 of the main forces respectively, as a result of which in particular the third main force brace 142 is available as a whole for receiving the belt restraining forces 114.

The belt restraining forces 114 are indicated here by way of example with respect to a diagrammatically illustrated belt 152 of the belt restraining system (not further numbered in this case).

It is to be understood that the embodiments explained above are only first arrangements of the invention. In this respect the arrangement of the invention is not restricted to these embodiments.

Certain features disclosed in the application are understood to be novel, including for example, features either individually or in combination with other features as compared with the prior art.

LIST OF DRAWING ELEMENTS 1 vehicle seat
2 seat part
3 backrest
4 belt restraining system
5 belt lock
6 belt reversal device
7 support structure
8 bodywork component
9 floor of the driver's cab
10 sheet metal cladding
11 upper third
12 corner region
13 seat area
14 belt restraining forces
15 fastening
16 fastening region
17 lower end
18 foot region
19 horizontal forces
20 vertical forces
21 conventional height
22 new height
23 vertical plane
24 fastening device
25 usual fastening point
26 fastening plate
30 structural braces
42 third main force brace
50 first end region
51 further end region
101 front passenger seat of the vehicle
102 seat part
105 belt lock
106 belt reversal device
107 support structure
112 corner region
113 seat area
114 belt restraining forces
130 structural braces
131 asymmetrical framework
132 guiding device of the main forces
133 first line of action of the main forces
134 second line of action of the main forces
135 third line of action of the main forces
136 junction region
137 belt mounting
138 first main force brace
139 front foot of the support structure
140 second main force brace
141 first rear foot of the support structure
142 third main force brace
143 upper part
144 lower part
145 further rear foot of the support structure
146 further front foot of the support structure
147 three-leg framework
148 top side
149 underside
150 first end region
151 further end region
152 belt
156 rear vertical brace
157 horizontal vertical brace
158 structural brace
159 front vertical brace
160 horizontal brace
161 belt lock side
162 vertical support brace
163 seat part mounting brace
164 cross brace
165 seat part frame
166 junction point
167 transverse connecting brace
168 horizontal connecting brace
169 oval brace
170 brace arrangement

We claim:

1. A vehicle seat comprising a seat part, a backrest, a belt restraining system and a support structure for supporting the seat part as well as the backrest, in which the belt restraining system comprises a belt reversal means and a belt lock and in which the belt reversal means is positioned in an upper corner region of the backrest and the belt lock is positioned in a seat area of the seat part, characterized in that the support structure has an asymmetrical framework with main force braces extending substantially vertically, in which on a top side of the support structure the main force braces converge in a junction region and on a underside of the support structure a first one of the main force braces is arranged on the side towards the junction region as a thrust brace guided forwards as far as a front foot of the support structure, a second one of the main force braces is arranged on the side towards the junction region as a tension brace at the rear guided as far as a first rear foot of the support structure and a third one of the main force braces is arranged as a tension/thrust brace at the rear guided as far as a further rear foot of the support structure, wherein the three main force braces form a guiding device of main forces acting on the vehicle seat, wherein said main forces are essentially guided along three lines of action which are converging in the junction region and are arranged at a greater distance from one another on the underside of the support structure than in the junction region, wherein a fastening means of the belt lock is arranged in the lower third or in the lower quarter of the third main force brace.

2. A vehicle seat according to claim 1, characterized in that the belt reversal means is arranged on a first end region of the third main force brace and the fastening of the belt lock is arranged on a further end region of the third main force brace opposite the first end region.

3. A vehicle seat according to claim 1, characterized in that the first main force brace is arranged, in particular above the seat part, extending to a point in front of the backrest and is arranged laterally on or adjacent to the seat part.

4. A vehicle seat according to claim 1, characterized in that the first main force brace is curved and is made bulbous in the sitting direction.

5. A vehicle seat according to claim 1, characterized in that the second main force brace is arranged behind the seat part and is made bulbous in the sitting direction and/or the third main force brace is arranged transversely behind the seat part as viewed in the sitting direction.

6. A vehicle seat according to claim 1, characterized in that the third main force brace is arranged supported on the side towards the foot of the support structure on a triangle arrangement comprising further support structure braces.

7. A vehicle seat according to claim 6, characterized in that a rear vertical brace of the triangle arrangement extends from the further rear foot of the support structure to the junction region and, in particular, merges into the second main force brace there.

8. A vehicle seat according to claim 6, characterized in that a front vertical brace of the triangle arrangement is arranged orientated vertically towards the front from the further rear foot of the support structure and in particular supports a horizontal brace of the triangle arrangement.

9. A vehicle seat according to claim 6, characterized in that a horizontal brace of the triangle arrangement extends from a rear vertical brace of the triangle arrangement as far as a further front foot of the support structure.

\* \* \* \* \*